United States Patent [19]
Stewart et al.

[11] Patent Number: 5,408,669
[45] Date of Patent: Apr. 18, 1995

[54] COMPUTER SYSTEM FOR SENSING A CABLE-CONNECTED PERIPHERAL AND FOR SUPPLYING POWER THERETO

[75] Inventors: Gregory N. Stewart; David Lunsford, both of Austin, Tex.

[73] Assignee: Dell USA, L.P., Austin, Tex.

[21] Appl. No.: 271,208

[22] Filed: Jul. 5, 1994

Related U.S. Application Data

[63] Continuation of Ser. No. 902,329, Jun. 22, 1992, abandoned, and a continuation-in-part of Ser. No. 831,217, Feb. 7, 1992, abandoned.

[51] Int. Cl.⁶ .................................................. G06F 7/10
[52] U.S. Cl. .......................... 395/750; 364/DIG. 1; 364/235; 364/235.7; 364/248.1; 364/273; 364/273.2; 364/273.5
[58] Field of Search ................ 364/DIG. 1 MS Files, 364/DIG. 2 MS Files, 492; 395/275, 575, 725, 800, 750, 325, 500; 307/456, 455, 270, 253, 66; 320/15

[56] References Cited

U.S. PATENT DOCUMENTS

| | | | |
|---|---|---|---|
| 5,038,299 | 8/1991 | Maeda | 364/519 |
| 5,151,992 | 9/1992 | Nagae | 395/750 |
| 5,179,710 | 1/1993 | Coschieri | 395/750 |
| 5,300,874 | 4/1994 | Shimamoto et al. | 320/15 |
| 5,335,338 | 8/1994 | Proesel | 395/500 |

OTHER PUBLICATIONS

TEAC, Inc., TEAC 3.5-Inch Floppy Disk Drive, FD-05 Series, 1991.
TEAC, Inc., TEAC FD-05HF-030 Micro Floppy Disk Drive Specification, Rev. B, 1991, pp. i-ii, 1-32.

*Primary Examiner*—Robert B. Harrell
*Attorney, Agent, or Firm*—Robert Groover; James Huffman; Gary R. Stanford

[57] ABSTRACT

A computer system including an input/output (I/O) connector for connecting to an external data peripheral, where the computer includes circuitry for detecting the presence or absence of a load on a first pin and for providing power to the external data peripheral through a second pin of the I/O connector. In this manner, the external data peripheral need not include a separate power supply, but instead is sensed and powered by the computer itself through the I/O connector. In the preferred embodiment, the I/O connector is coupled to parallel port circuitry for interfacing to an external printer, and also to a floppy controller for interfacing with an external floppy drive, where the computer system further includes circuitry to switch from the printer controller to the floppy controller when an external floppy drive is connected to the I/O connector. In this manner, the same I/O port automatically serves either an external printer or an external floppy drive.

25 Claims, 16 Drawing Sheets

COMPUTER SYSTEM FOR SENSING A CABLE-CONNECTED PERIPHERAL AND FOR SUPPLYING POWER THERETO

CROSS-REFERENCE TO OTHER APPLICATIONS

This is a continuation of application Ser. No. 07/902,329, filed on Jun. 22, 1992, now abandoned.

PARTIAL WAIVER OF COPYRIGHT PURSUANT TO 1077 O.G. 22 (3/20/87)

All of the material in this patent application is subject to copyright protection under the copyright laws of the United States and of other countries. As of the first effective filing date of the present application, this material is protected as unpublished material.

However, permission to copy this material is hereby granted to the extent that the owner of the copyright has no objection to the facsimile reproduction by anyone of the patent document or patent disclosure, as it appears in the United States and Trademark Office patent file or records, but otherwise reserves all rights whatsoever.

The present application is a continuation-in-part application, claiming priority from the following commonly-owned application:

Ser. No. 831,217, filed Feb. 7, 1992 and now abandoned, entitled "Portable Computer with Automatic Adaptation to Different Device Types on a Standard Port", which is hereby incorporated by reference.

The following applications of common assignee contain at least some drawings in common with the present application, and are believed to have effective filing dates identical with that of the present application, and are all hereby incorporated by reference:

Ser. No. 07/903,074, filed Jun. 22, 1992, now abandoned, entitled "Electronic System with Compact Card Ejector" (DC-254); and Ser. No. 07/901,645, filed Jun. 22, 1992, now abandoned, entitled "Computer System with IC Card BIOS Override Circuit" (DC-256). These applications show other features of the presently preferred embodiment (which are not necessary for making or using the claimed inventions), and are all hereby incorporated by reference.

BACKGROUND AND SUMMARY OF THE INVENTION

The present invention relates to computer systems (and particularly to small computer systems), and to methods for using them.

The innovations disclosed in the present application provide computer systems (especially very small portable personal computers) which have advantageous new capabilities.

Laptop and Smaller Computers

Portable personal computers were introduced in the early 1980s, and proved to be very useful and popular. As this market has developed, it has become increasingly clear that users strongly desire systems to have small volume, small weight, physical durability, and long battery-powered lifetime. Thus, small portable computers ("laptop" computers) have proven extremely popular during the late 1980s. Users continue to demand more features, longer time between recharges, and lower weight and volume. This combination of demands is difficult to meet. In about 1990, another smaller generation of portable computers ("notebook" computers) began to appear, and further generations are now starting to appear or being discussed. This continuing shrinkage of form factors will only exacerbate the difficulty of the above tradeoffs.

Some Difficulties of Small Size

To meet the weight, volume, and power budgets of small portable computers, much effort has been made to re-engineer familiar components, within the limits of acceptable compromise with user comfort and convenience, to attain the needed portability. For example, almost no laptop or notebook computers have had more than two disk drives (typically one floppy drive and one hard drive); the keyboards are much smaller than would be optimal for touch typists; and the displays are much smaller than on common desktop models.

Where such compromises are needed to attain the overriding goal of portability, users readily accept them. However, if these compromises can be avoided some of the time, it is highly desirable to do so. Thus, for example, many users will "dock" their laptop or notebook computers, when on their desktops, to better peripherals than could be carried with the portable computer.

Portable computers are inherently more susceptible than desktop computers to accident, loss, and theft. Thus, if critical work is being done on a portable computer, backup is even more of a necessity than with a desktop computer.

Laptops normally have a severely limited set of external ports. This limitation is imposed by several factors: first, each external connector takes up precious square inches of surface area. Second, each external connector is a point of vulnerability to electrostatic-discharge-induced component failure. Third, each external connector is a possible point of entry for dirt and moisture. Fourth, in calculating the worst-case power budget for a system, the possible power required by all connectors must be considered.

Similar problems arise from the need for bus extension. Internal space is not available for expansion cards, as in a normal personal computer; but needs for expansion still exist. Some small computers have brought out key bus lines into an external connector, but of course this is unwieldy. Other small computers have sent signals out over a port to an independently-powered extension bus controller with bus slots which would emulate the computer's internal bus.

Thus, in general, as convenient as small portable computers are, there is some difficulty getting data into and out of them. Usually the only available data routes are through a modem or through the floppy drive.[1] This has been recognized as a problem, and many vendors have offered external drive connections for small portable computers.

[1] Some portable computers have LAN interface cards, but this is an expensive option, and requires a compatible LAN to interface to.

It is believed that one prior portable computer, marketed by Toshiba, included a manual switch for rerouting signals onto the printer port. However, this arrangement did not provide the advantages of the automatic rerouting provided by the inventions disclosed herein.

"Docking" a Portable Computer

Users find it very convenient to "dock" a portable computer on their desktop, to a full-size keyboard and- /or display. When a portable computer is used in such a configuration, users will also wish to use many of the peripherals (such as printer, modem, fax machine, tape backup devices, or additional disk drives) which are easily available with a desktop computer.

This problem becomes more urgent as useful amounts of computing power become more available in physically small portable computers.

The Parallel Port in the ISA Architecture

A standard part of the ISA architecture is a parallel port which has a fairly standard definition. The pinout of this port, in the standard DB-25 connector, is shown in (e.g.) Dowden, INSIDE THE EISA COMPUTER (1990), which is hereby incorporated by reference.

The standard use of the parallel port is to output quantities of data to a printer, and get back status signals from the printer. However, it is known that a parallel port can be used for fully bidirectional data transfer. See generally Greenberg, "Adapting the parallel port for bidirectional communication," *Microsoft Systems Journal*, Vol. 5 No., 5 (Sept. 1990), at 107ff, which is hereby incorporated by reference.

Disk Drives

An essential part of any computer is some sort of mass storage, which is normally a disk drive. At the lowest level, a disk drive is made of several rotating platters, each coated with a magnetic medium like that used in magnetic recording tape. Tape heads (each a solenoid with a gap which is positioned close to the magnetic medium) are moved over the rotating platters, and the magnetic field at the tape head is sensed or driven to read or write data to specific locations on the rotating platter.

When a tape drive reads data, the changing magnetic fields at the head will produce a varying analog voltage. Some significant signal processing activity is normally needed to convert this analog voltage to a correct digital data sequence.

In personal computers, this signal processing is usually performed in a disk drive controller on the motherboard, which is separate from the disk drive and is connected to it by a cable. Thus, this cable carries analog signals and low-level control signals. See generally, e.g., Rosch, "Boost the basics: upgrade your floppy disk drive," *PC Sources,* vol. 2 no. 4 (April 1991), at 230ff, which is hereby incorporated by reference; Martin, "Floppy Disk Controllers Feature Some Important Extras," *Compute Design* vol. 25 no. 15 Aug. 15, 1986), at 22ff, which is hereby incorporated by reference; Young, "Constant-density recording comes alive with new chips," *Electronic Design,* Nov. 13, 1986, at 141ff, which is hereby incorporated by reference; and Bursky, "Floppy-disk controller puts it all on one chip," *Electronic Design,* Sep. 4, 1986, at pp. 69ff, which is hereby incorporated by reference.

Some personal computers have had the capability for addition of an external floppy disk drive (or tape drive or hard disk drive). This was normally accomplished by providing external control electronics for the external drive, or by bringing out the analog lines from the drive controller to an external connector.

Innovative Computer System and Method

The disclosed innovations provide a very small battery-powered portable computer system which does not include any internal floppy disk drive. Instead, this computer uses a lightweight external floppy disk drive which does not include any power supply whatever. Instead, the disk drive is powered from the computer itself, through its connection cable. To save on connector space, the drive's connection cable is connected to the computer's parallel port.

Hardware multiplexing is used to automatically connect the floppy disk controller circuit to the parallel port connector whenever the external floppy drive has been connected, and to automatically connect the parallel port driver circuit to the parallel port connector at all other times.

When the external floppy drive is connected, and the resulting voltage change is detected, a power supply line is routed to a second preselected one of the pins of the parallel port connector, and provides the power supply for the external floppy drive. To avoid possible problems with printers or other accessories, this second preselected pin (pin 1, in the presently preferred embodiment) is preferably chosen to be an output-only pin in the standard parallel-port pin assignment.

This arrangement provides significant advantages in the system design and ergonomics of a small computer system. First, for a given total power supply weight, integrated power management is possible, so that the weight-limited power budget can be used as efficiently as possible. Second, by making the configuration of the overall system more modular, the user can select how heavy and bulky a package he needs for a particular trip. Third, the use of multifunction connectors economizes on the computer's volume without harming user convenience (since the peripherals are normally only needed during a small fraction of the system's time in use).

BRIEF DESCRIPTION OF THE DRAWING

The present invention will be described with reference to the accompanying drawings, which are schematic for clarity and which are incorporated in the specification hereof by reference, wherein:

FIGS. 4A, 4B, 4C, 4D, 4E, 4F, 4G, 4H, and 4I show the circuitry used, in the presently preferred embodiment, to detect the presence of the external floppy drive from the voltage on pin 24, and to make the proper connections to the printer port accordingly.

DESCRIPTION OF THE PREFERRED EMBODIMENTS

Figure 1A:
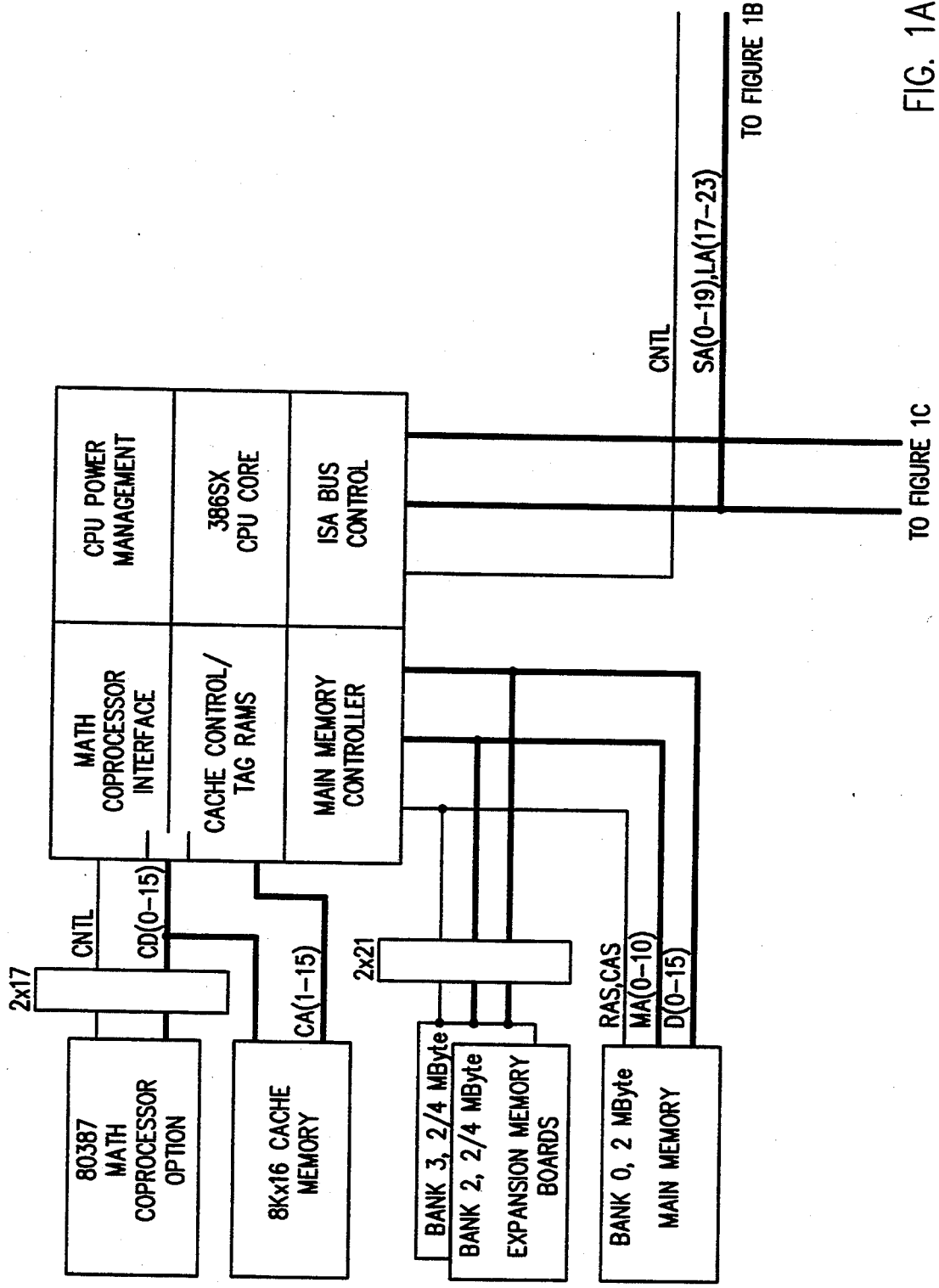
FIGS. 1A, 1B, 1C, 1D and 1E are parts of a single block diagram of the electrical organization of the small computer system of the presently preferred embodiment.
Figure 1B:
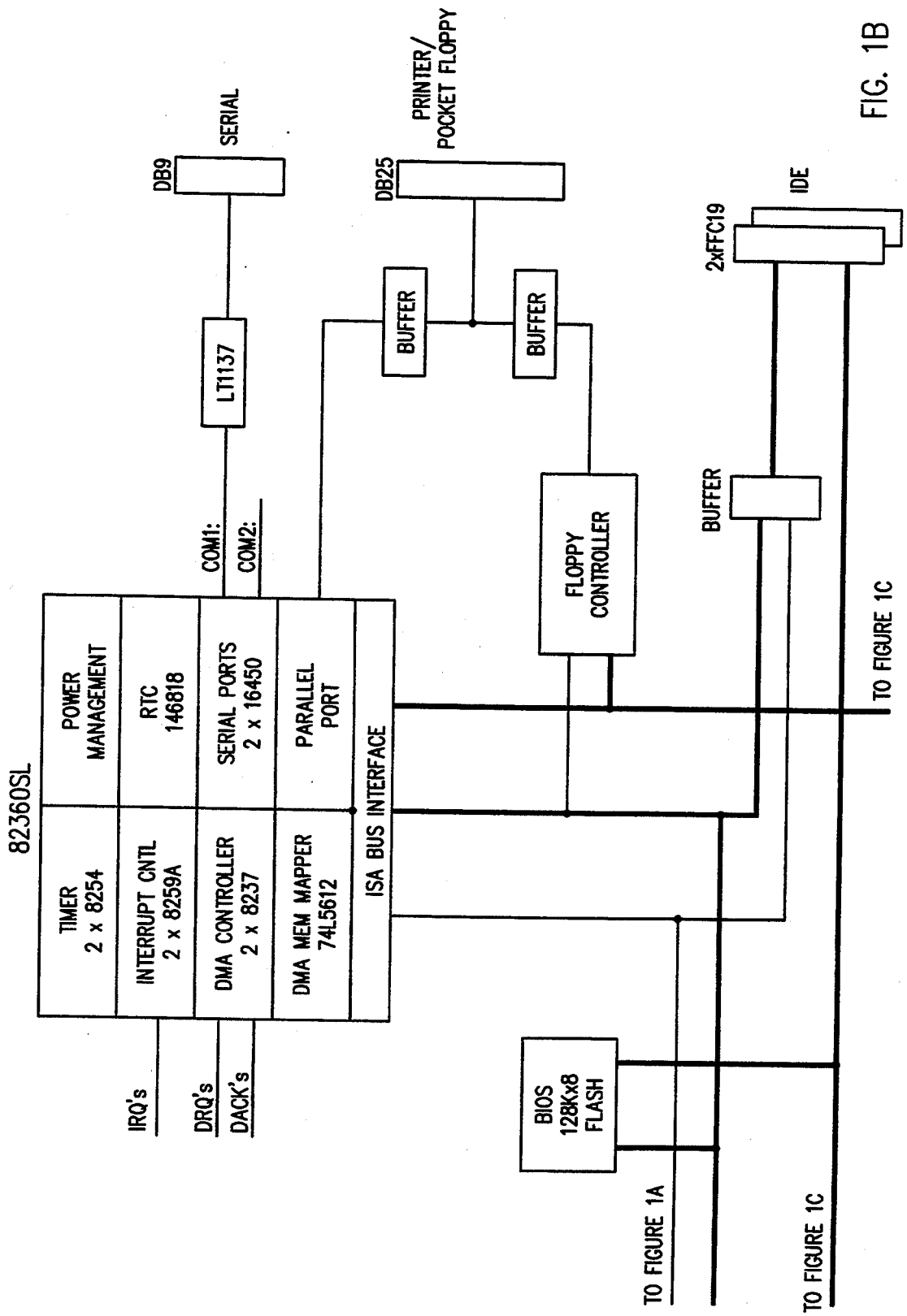
Figure 1C:
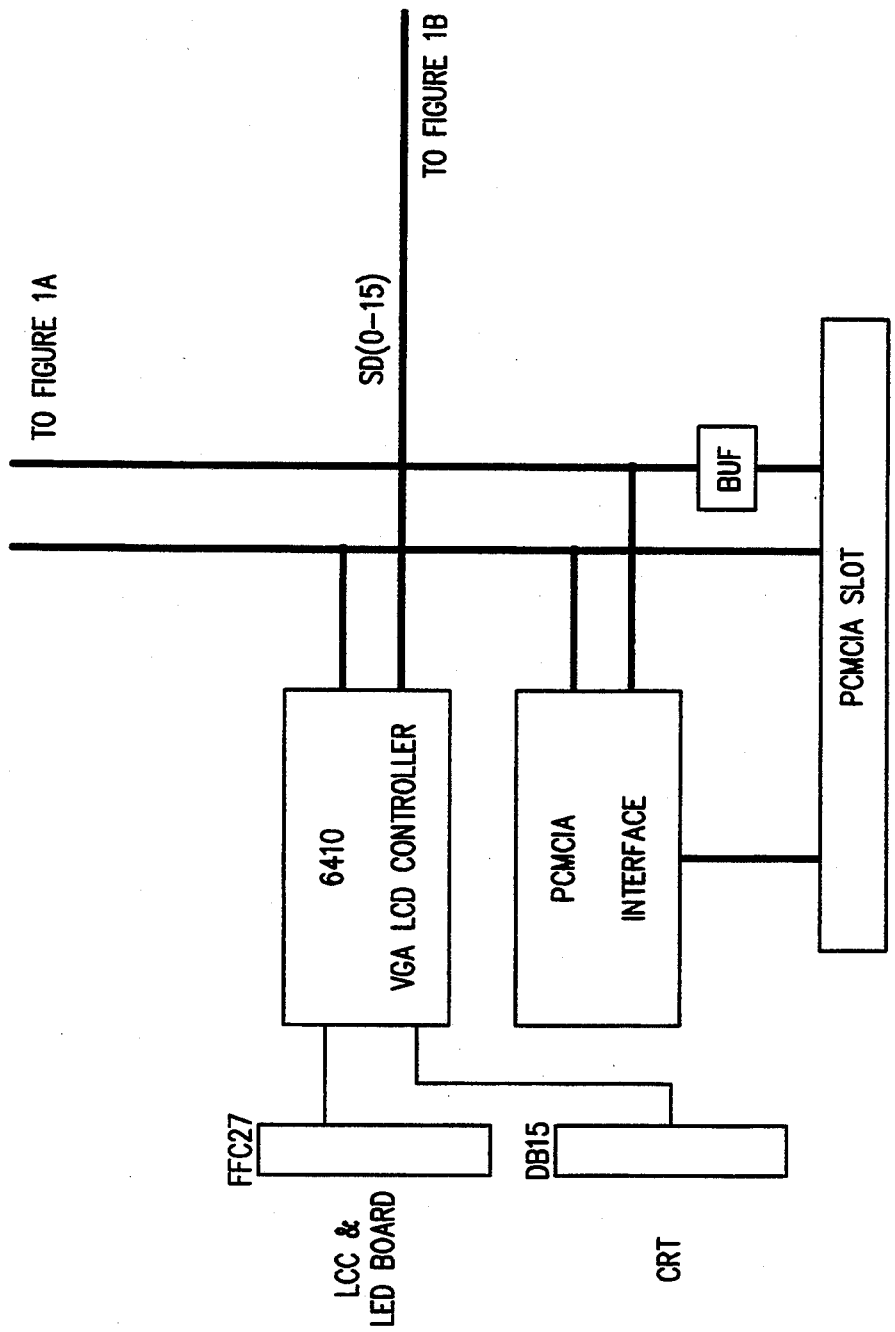
Figure 1D:
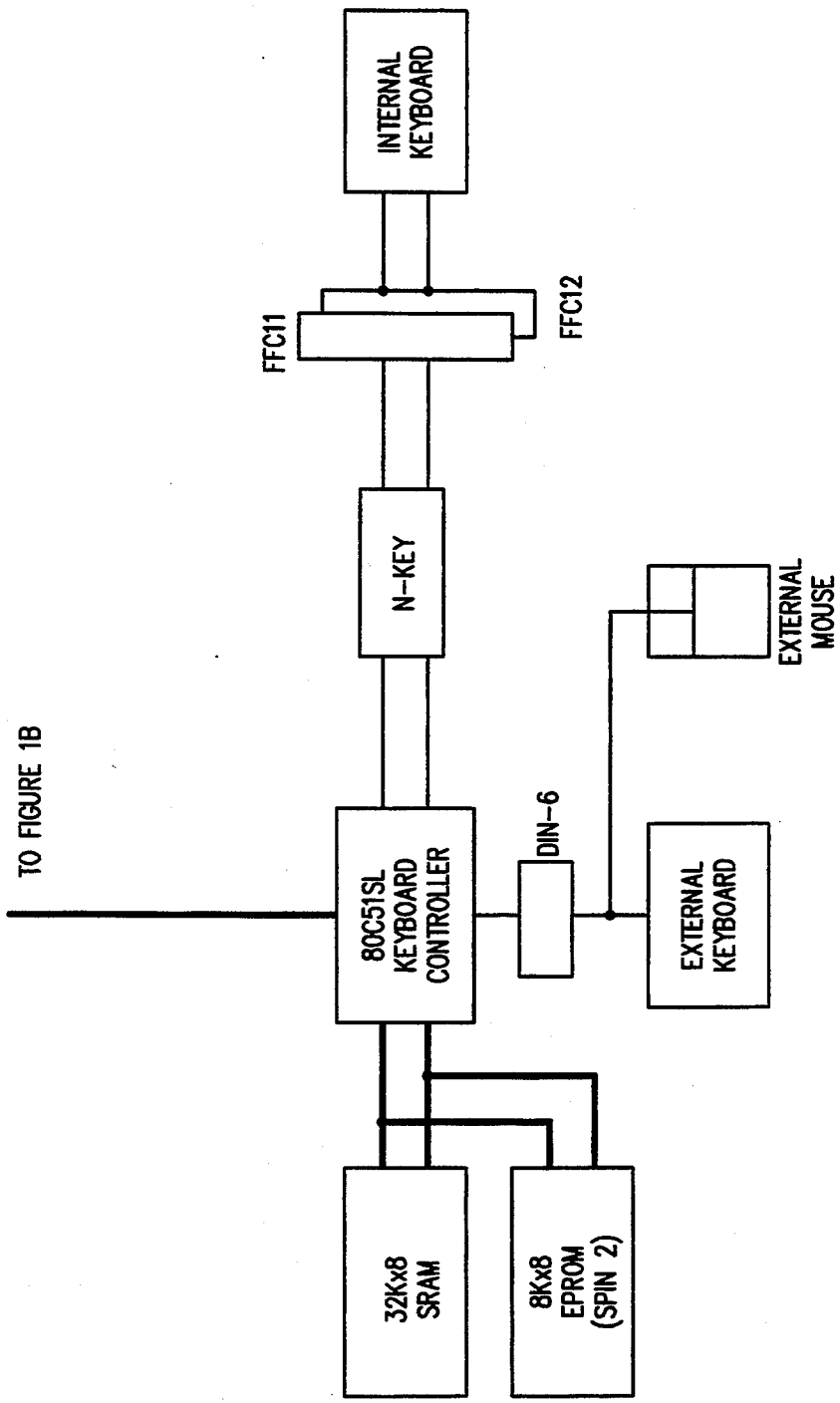
Figure 1E:
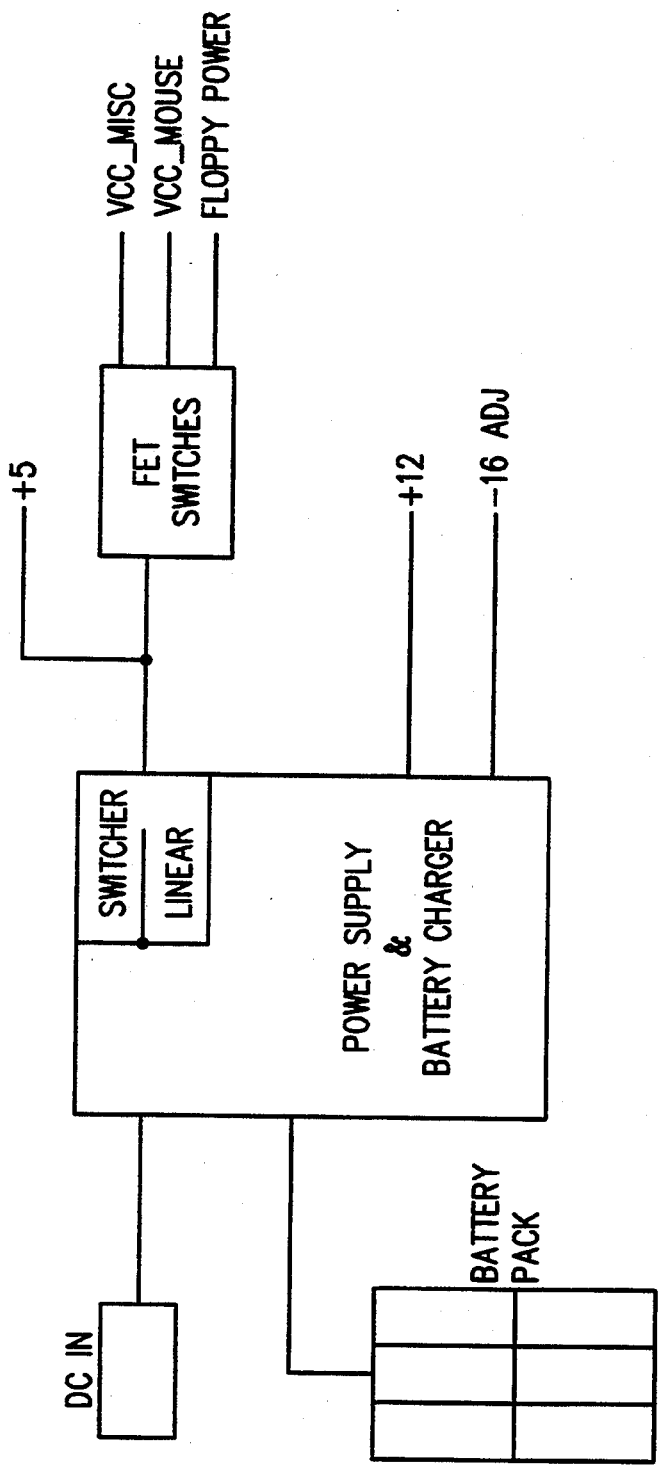

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Hardware Implementation Details

Following is a sample specific implementation of hardware portions of the disclosed innovations. This example is intended to better illustrate the disclosed generally applicable innovations, and to comply with the best-mode requirements of US patent law; but of course this specific implementation is subject to change (and will certainly be changed as time goes by), and can be altered, as will be apparent to those skilled in the art, in many details.

FIGS. 1A, 1B, 1C, 1D and 1E are parts of a single block diagram of the electrical organization of the small computer system of the presently preferred embodiment.

The system of the presently preferred embodiment weighs 3.6 pounds with battery, and is based on an Intel 386SL microprocessor running at 20 MHz. The system chassis, in the presently preferred embodiment, is 7.75-inches deep by 11 inches wide and 1.25-inches high.

The system includes 2-megabytes (MB) of system memory, expandable to 10 MB; a 3.5-inch, 1.44 MB portable diskette drive; and a 60 MB internal hard disk drive. Larger capacity hard drive configurations of 80 MB or 120 MB are available.

The preferred system embodiment incorporates an LCD display which is not edgelit (and hence has lower power requirements), yet offers an equivalent 12:1 contrast ratio, up to 640×480 resolution, and supports up to 64 gray scales. Reduced LCD power consumption allows the use of smaller, lighter batteries that together with efficient power management provide continuous screen display without LCD blank-outs. Directly mounting the LCD into the system housing also contributes to reduced overall system size and weight.

Integrated keyboard mouse support is also provided. This keyboard mouse emulation uses the Fn key and the cursor keys to emulate a mouse, as described in commonly-owned patent application 813,379, filed Dec. 23, 1991, entitled "Computer with Pointing Device Mapped into Keyboard" (DC-239), now abandoned and filed as Ser. No. 08/278,690, which is hereby incorporated by reference. This makes it convenient to use graphical user interface software, such as Windows, without having to carry an external mouse device.

A portable diskette drive (the "pocket floppy") is provided with each system and can be easily connected through the unit's parallel/diskette drive port. The device is highly portable, measuring 4.2 ×5.8×0.7 inches thick, and weighs 12 ounces.

A 10-ounce NiMH battery provides approximately three hours operating time on a single charge (without the use of power management modes). This battery measures 1.6×4.7×2.3 inches.

Configuration for Detecting, Powering, and Operating Floppy

Figure 3:
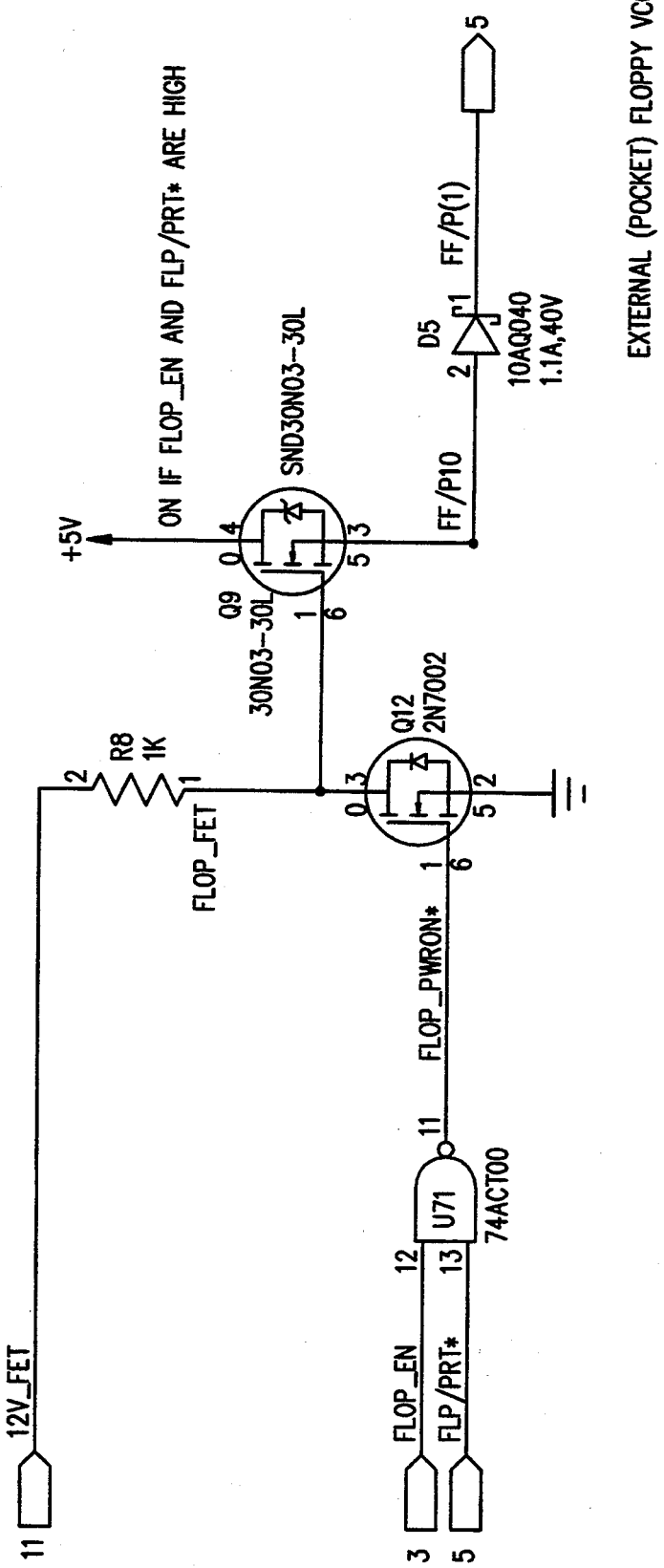
FIG. 3 shows the circuitry used, in the presently preferred embodiment, to send the full supply voltage out on pin 1 when the external floppy drive is in use.

FIG. 3 shows the circuitry used, in the presently preferred embodiment, to send the full supply voltage out on pin 1 when the external floppy drive is in use. Line FLOP_EN indicates that floppy operation is enabled, and line FLP/PRT* indicates that the external floppy drive is present. If lines FLOP_EN and FLP/PRT* are both active, then signal FLOP_PWRON goes active, and FETs Q12 and Q9 connect power rail VCC, through isolating diode D5, to line FF/P(1).

Figure 4A:
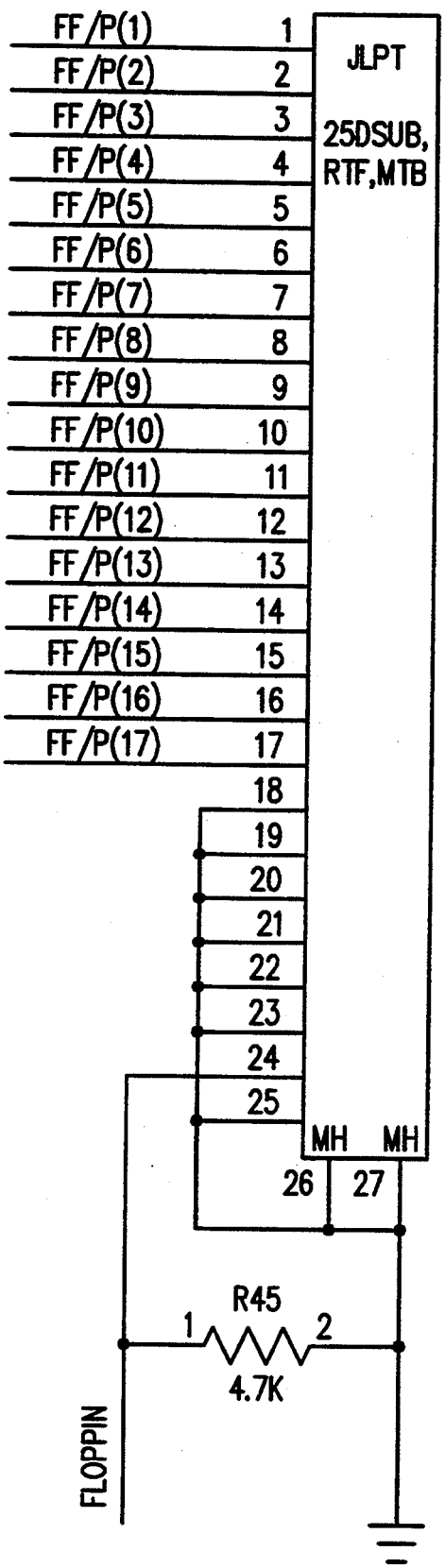
Figure 4B:
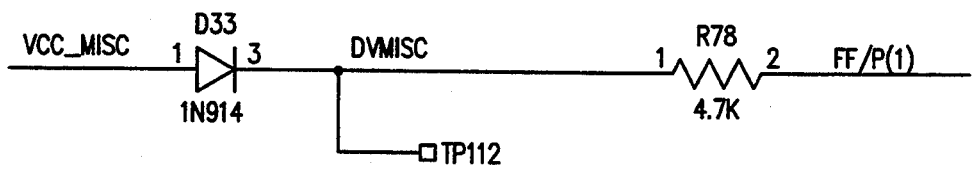
Figure 4C:
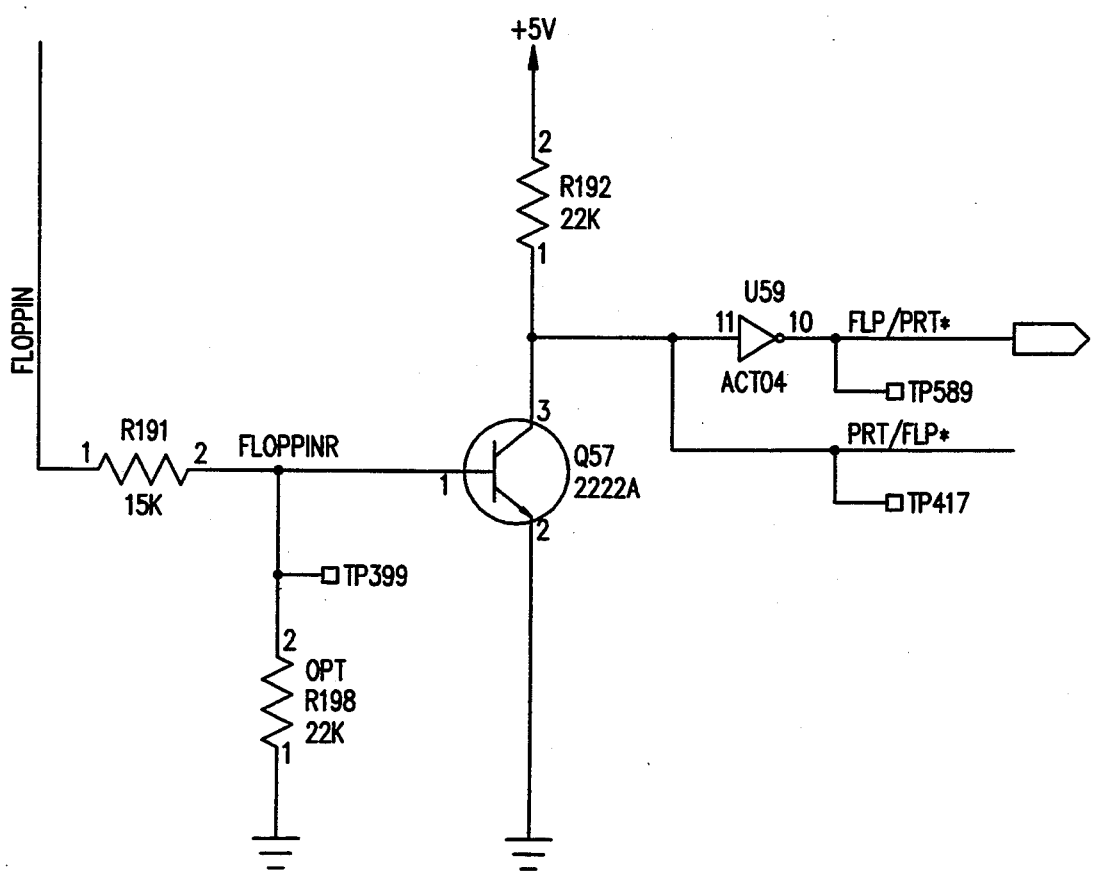
Figure 4D:
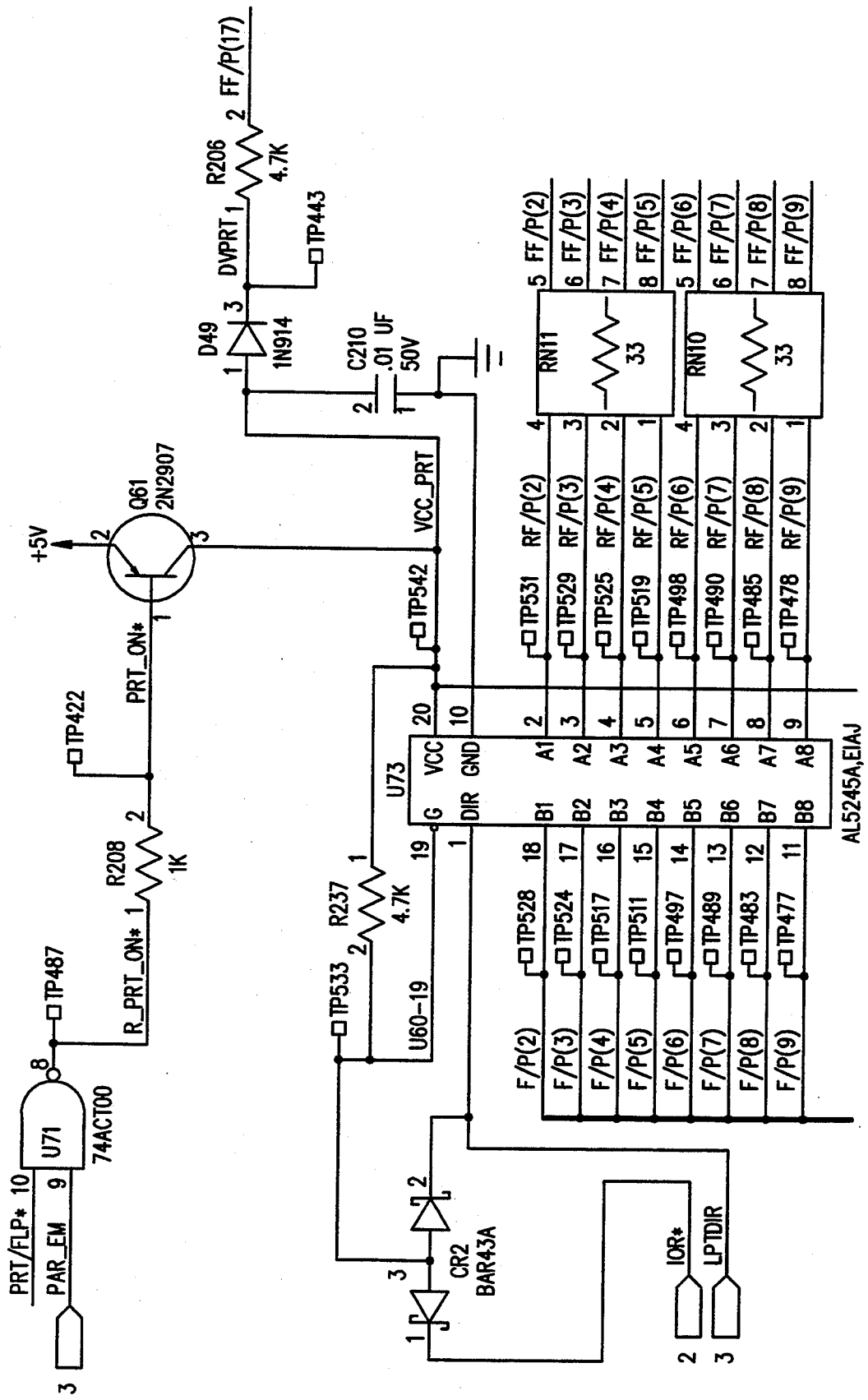
Figure 4E:
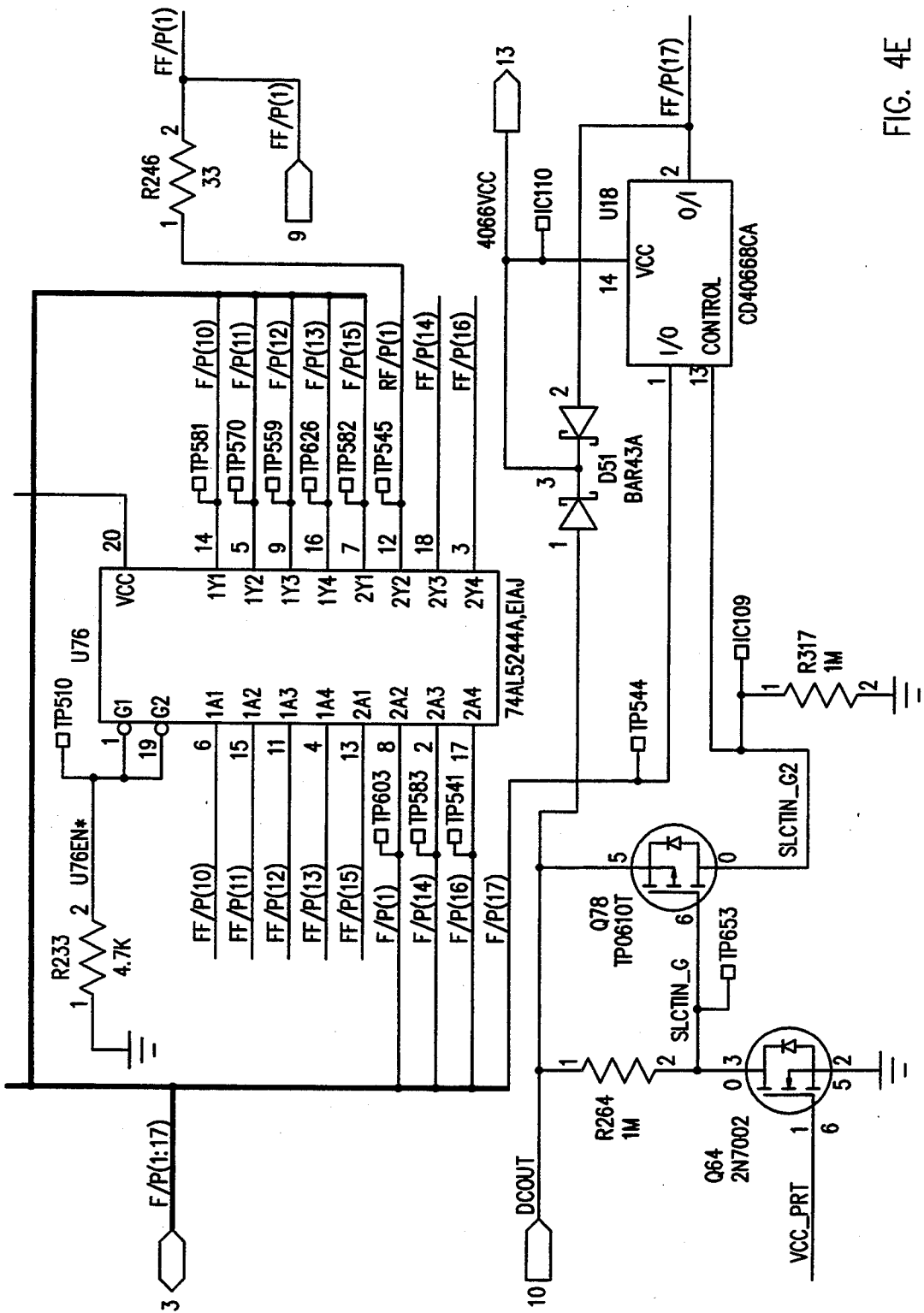
Figure 4F:
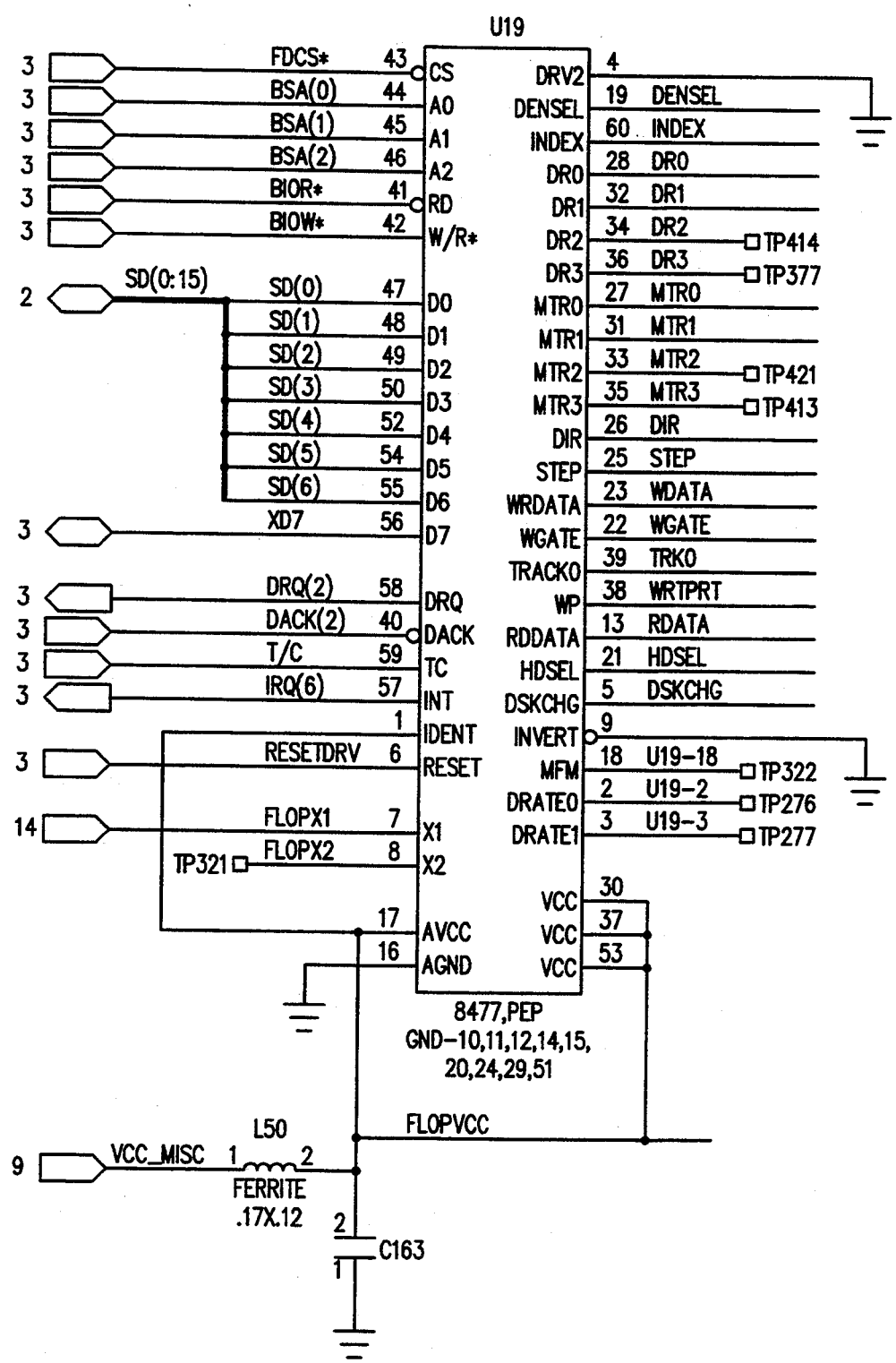
Figure 4G:
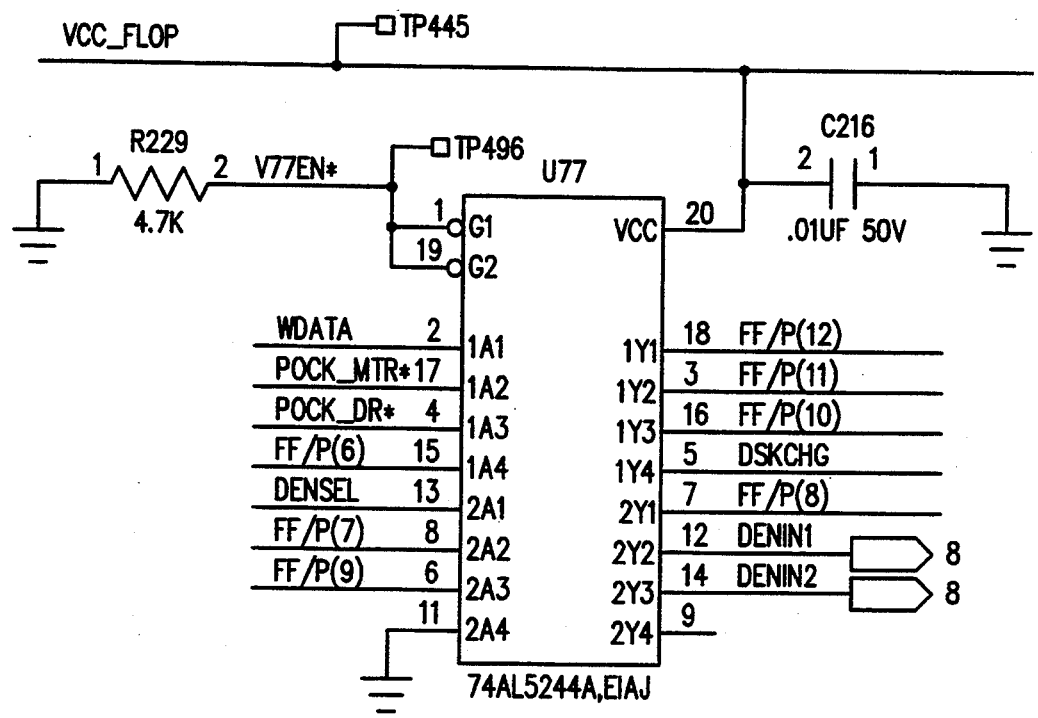
Figure 4H:
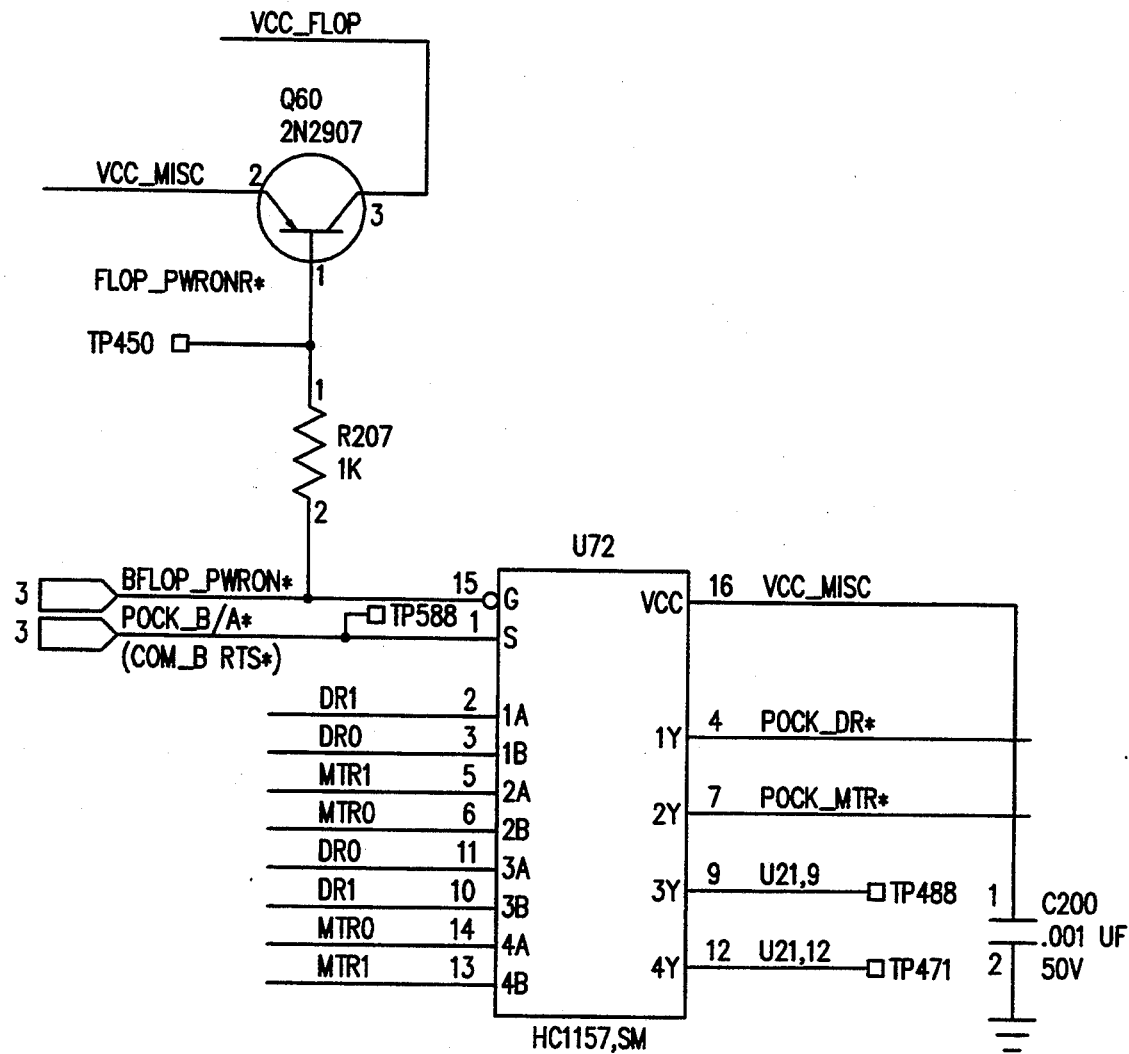
Figure 41:
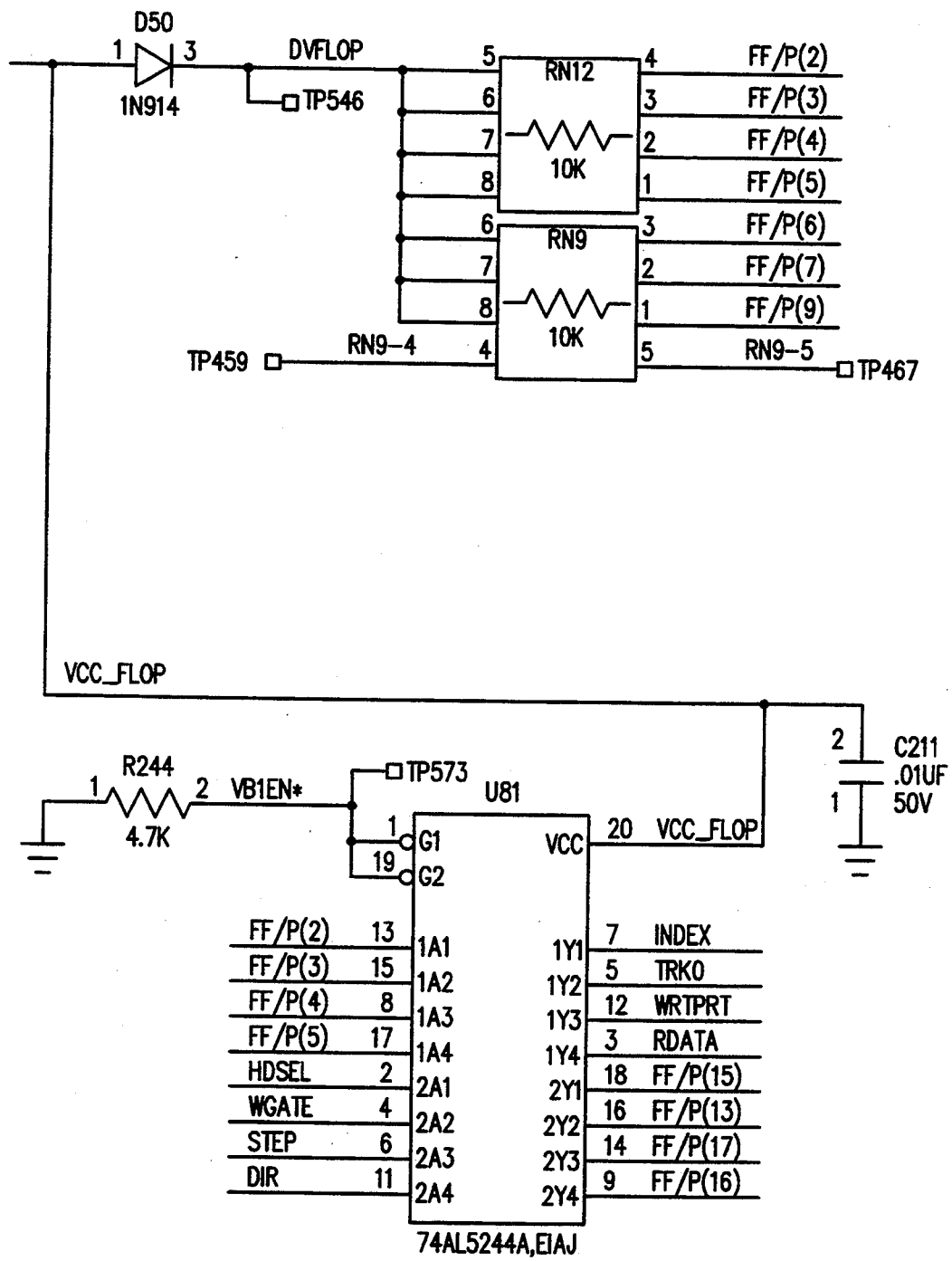

FIGS. 4A, 4B, and 4C show the circuitry used, in the presently preferred embodiment, to detect the presence of the external floppy drive.

FIG. 4A shows the connections to the parallel port connector. Note that a 4.7KΩ resistor to ground is provided on pin 24. Thus, when no device is connected to the connector, pin 24 will normally be at zero Volts.

However, as shown in FIG. 4B, a 4.7KΩ pullup resistor is connected from pin 1 to power supply voltage VCC_MISC (through an isolating diode). Thus, equal pull-up and pull-down resistors are provided on pins 1 and 24 of the parallel port connector. The external floppy drive floppy itself includes a direct connection from pins 1 to 24; so, when the pocket floppy is connected, the voltage on pin 24 will rise from ground to about 2.5 Volts. Pin 24 is connected to provide signal FLOPPIN, which is used by the presence detect circuit of FIG. 4C.

In the presence detect circuit of FIG. 4C, signal FLOPPIN is divided down (by 15KΩ resistor R191 and 22KΩ resistor R198) to provide the base input to bipolar Q57. As signal FLOPPIN rises above about 2 Volts, it will turn on bipolar Q57, which is connected in a collector follower configuration to pull down line PRT/FLP*. This line is inverted to produce the (digital) presence detect signal FLP/PRT*.

Figure 2:
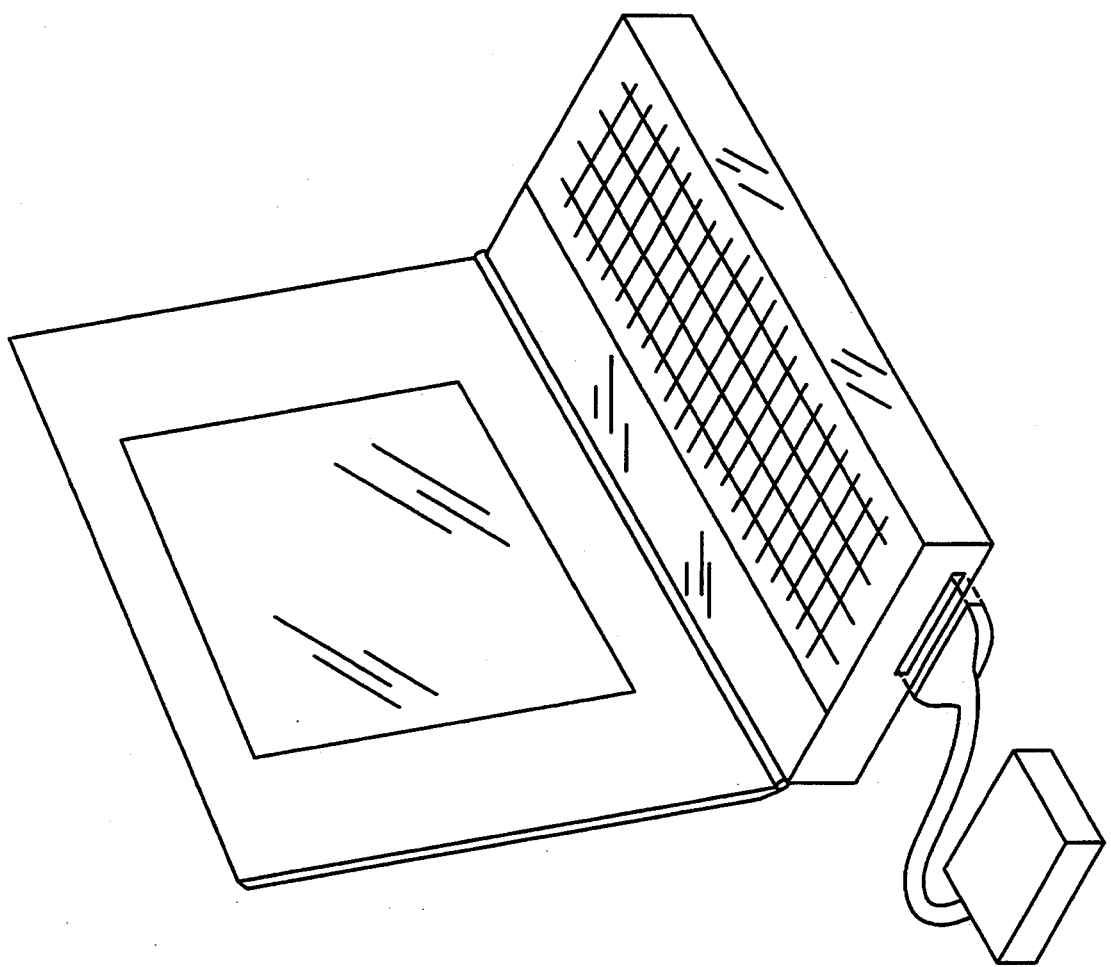
FIG. 2 gives an overview of the physical conformation of the small computer system of the presently preferred embodiment, with an external floppy disk drive connected thereto.
Figures 2A, 2B:
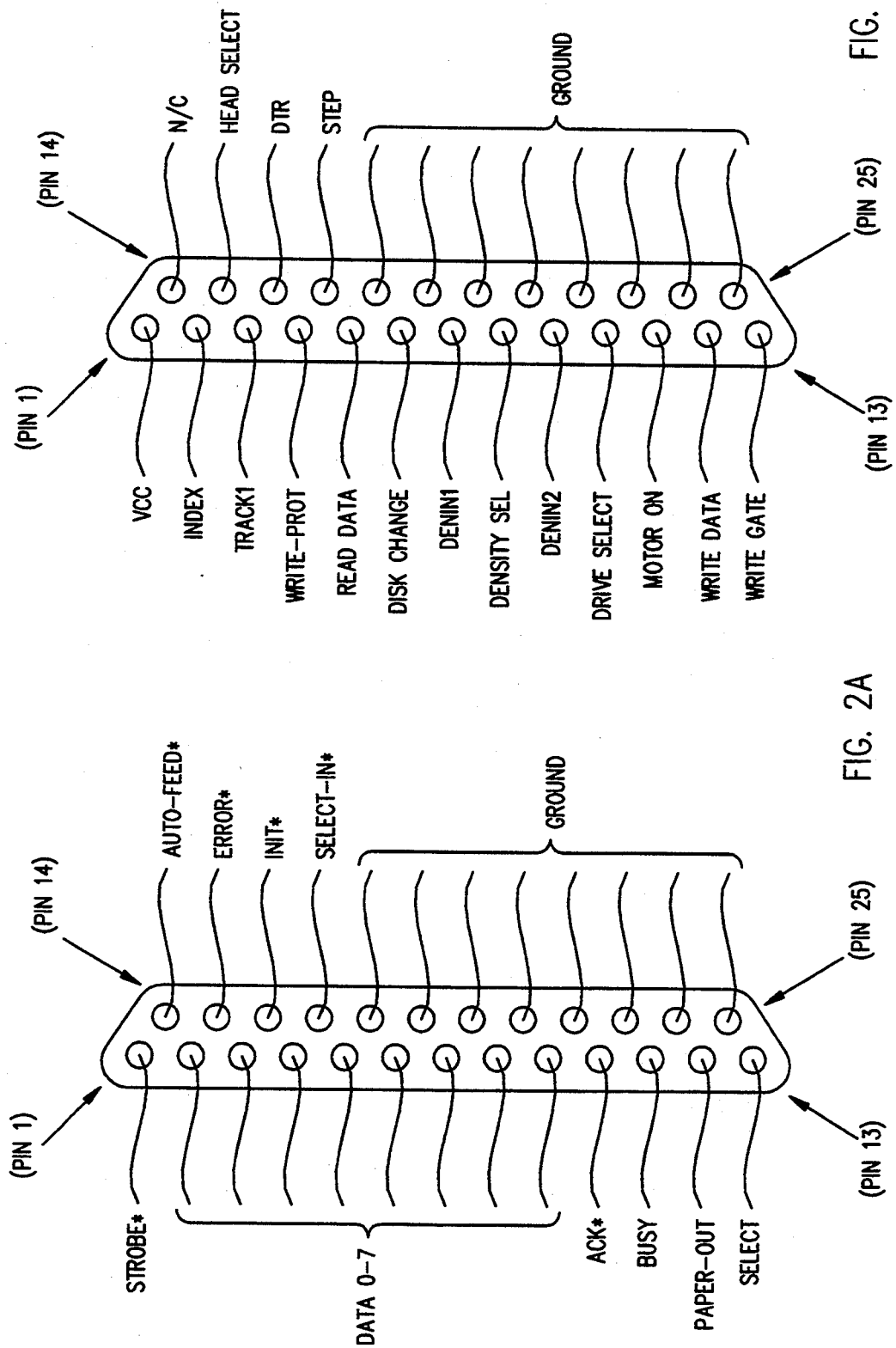
FIG. 2A shows the pinout of the standard DB-25 parallel port connector in the standard ISA architecture. These pin assignments are valid, in the presently preferred embodiment, when the DB-25 parallel port connector is being used for printer interface according to the standard ISA architecture, rather than for interface to an external floppy drive.
FIG. 2B shows the pin assignments used, according to the present invention, when the DB-25 parallel port connector is being used for interface to an external floppy drive.

Returning to FIG. 4A: lines FF/P(1) through FF/P(17) from the parallel port connector are simply multiplexed in hardware onto floppy controller and a conventional printer controller, in accordance with the state of FLP/PRT*, to produce the pin assignments shown in FIGS. 2A and 2B.

The resulting pin assignments, in the two modes, are as follows:

| Pin No. | Assignment in Printer Mode (FIG. 2A) | Assignment in Floppy Mode (FIG. 2B) |
|---|---|---|
| 1 | STROBE* | VCC |
| 2 | DATA 0 | INDEX |
| 3 | DATA 1 | TRACK 1 |
| 4 | DATA 2 | WRITE-PROT |
| 5 | DATA 3 | READ DATA |
| 6 | DATA 4 | DISK CHANGE |
| 7 | DATA 5 | DENIN1 |
| 8 | DATA 6 | DENSITY_SEL |
| 9 | DATA 7 | DENIN2 |
| 10 | ACK* | DRIVE SELECT |
| 11 | BUSY | MOTOR ON |
| 12 | PAPER-OUT | WRITE DATA |
| 13 | SELECT | WRITE GATE |
| 14 | AUTO-FEED* | N/C |
| 15 | ERROR* | HEAD SELECT |
| 16 | INIT* | DTR |
| 17 | SELECT-IN* | STEP |
| 18 | Ground | Ground |
| 19 | Ground | Ground |
| 20 | Ground | Ground |
| 21 | Ground | Ground |

-continued

| Pin No. | Assignment in Printer Mode (FIG. 2A) | Assignment in Floppy Mode (FIG. 2B) |
| --- | --- | --- |
| 22 | Ground | Ground |
| 23 | Ground | Ground |
| 24 | Ground | Ground |
| 25 | Ground | Ground |

Signals DENIN1 and DENIN2 are control signals for operation with a 2.88M floppy drive unit. Signal DENSITY_SELECT is another control signal which could be used for 2.88 floppy operation, but is considered to be less preferable than use of DENIN1 and DENIN2.

FIGS. 4D through 4I show additional details of the circuitry used, in the presently preferred embodiment, to make the proper signal connections to the printer port, depending on whether the printer or the external floppy drive is connected thereto. Note that lines FF/P(2), FF/P(3), FF/P(4), FF/P(5), FF/P(6), FF/P(7), and FF/P(9) have networks of series resistors interposed. The resistor values used are 10KΩ in floppy mode, and 33Ω in printer mode.

The drive unit itself, in the presently preferred embodiment, is a low-power 1.44M unit from Teac (type FD-05HF), but, of course, any other 3½" floppy drive (preferably, but not necessarily, low-power) can be used instead. The drive unit includes a Centronix connector (for a standard printer cable), with pins mapped to the floppy drive unit as shown in FIG. 2B. The drive unit, in the presently preferred embodiment, includes no other external connector for power input.

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

Note that other types of accessories can also be connected to the parallel port. In particular, it is contemplated that an external tape backup drive, powered from the portable computer, may also be advantageous.

It should also be noted that the disclosed innovative ideas are not limited only to DOS or UNIX systems, but can also be implemented in other operating systems.

It should also be noted that the disclosed innovative ideas are not limited only to ISA or EISA systems, but can also be implemented in systems using other bus architectures.

It should also be noted that the disclosed innovative ideas are not limited only to systems based on an 80×86-compatible microprocessor, but can also be implemented in systems using 680×0, RISC, or other processor architectures.

As will be recognized by those skilled in the art, the innovative concepts described in the present application can be modified and varied over a tremendous range of applications, and accordingly the scope of patented subject matter is not limited by any of the specific exemplary teachings given.

What is claimed is:

1. A computer system, comprising:
    a chassis which includes:
        at least one battery, and at least one external power connection, and power supply circuitry connected to provide power from said battery or said external power connection through a power supply line;
        at least one multiline I/O connector mounted on said chassis, said I/O connector including a plurality of pins; and
        circuitry connected to detect a presence or absence of a load on a first predetermined pin of said I/O connector, and accordingly to connect said power supply line from said battery to a second predetermined pin of said I/O connector;
    a cable for connecting to said I/O connector; and
    at least one external data peripheral which includes a signal connector for connecting to said I/O connector of said system chassis through said cable, and which is connected to draw power from said battery via said I/O connector and said signal connector.

2. The system of claim 1, further comprising a primer which can be connected to said I/O connector; and a CPU, wherein said printer is controlled by said CPU.

3. The system of claim 2, wherein said printer includes a separate respective power supply.

4. The system of claim 1, wherein said external data peripheral is a floppy disk drive.

5. The system of claim 1, wherein said external data peripheral is a floppy disk drive, and wherein said chassis does not contain any floppy disk drive.

6. The system of claim 1, wherein said chassis is hinged, and includes a keyboard in one portion thereof and a display in another portion thereof.

7. The system of claim 1, further comprising:
    volatile random-access memory in said chassis; and a CPU, said CPU being operatively connected to read and programmably execute software programs from said random-access memory.

8. The system of claim 1, further comprising a hard disk drive in said chassis.

9. The system of claim 1, further including a CPU, wherein said CPU comprises only one microprocessor.

10. The system of claim 1, further comprising a CPU, wherein said CPU controls power sent from said battery to said external data peripheral.

11. A computer system, comprising:
    a chassis which includes:
        at least one central processing unit (CPU);
        at least one battery, and at least one external power connection, and power supply circuitry connected to said CPU to provide power from said battery or said external power connection; and
        a plurality of input/output devices operatively connected to said CPU, including at least one multiline I/O connector mounted on said chassis;
    a cable for connecting to said I/O connector; and
    at least one external data peripheral which includes a signal connector for connecting to said I/O connector of said system chassis through said cable, and which is connected to draw power solely from said battery through said signal connector and said cable;
    wherein said CPU controls said power supply circuitry, to selectively supply power to said external data peripheral, as determined by software running on said CPU.

12. The system of claim 11, wherein said external data peripheral is a floppy disk drive.

13. The system of claim 11, wherein said external data peripheral is a floppy disk drive, and wherein said chassis does not contain any floppy disk drive.

14. The system of claim 11, wherein at least one of said plurality of input/output devices are contained in said chassis.

15. The system of claim 11, wherein said chassis is hinged, and includes a keyboard in one portion thereof and a display in another portion thereof.

16. The system of claim 11, wherein said CPU comprises only one microprocessor.

17. The system of claim 11, wherein at least one of said plurality of input/output devices is a keyboard and is contained in said chassis.

18. The system of claim 11, wherein at least one of said plurality of input/output devices is a display and is contained in said chassis.

19. A computer system, comprising:
 a system chassis which includes:
  at least one central processing unit (CPU);
  at least one battery, and at least one external power connection, and power supply circuitry connected to said CPU to provide power from said battery or said external power connection through a power supply line;
  a plurality of input/output devices, including at least one multiline I/O connector having a plurality of pins mounted on said system chassis; and
  circuitry connected to detect a presence or absence of a load on a first predetermined pin of said I/O connector, and accordingly to connect said power supply line from said battery to a second predetermined pin of said I/O connector;
 a cable for connecting to said I/O connector: and
 at least one external data peripheral which includes a signal connector for connecting to said I/O connector of said system chassis through said cable, and which is connected to draw power solely from said battery through said signal connector and said cable; and
 wherein said power supply circuitry supplies power to said external data peripheral, as enabled by said CPU.

20. The system of claim 19, wherein said external data peripheral is a floppy disk drive.

21. The system of claim 19, wherein said external data peripheral is a floppy disk drive, and wherein said chassis does not contain any floppy disk drive.

22. The system of claim 19, wherein at least one of said plurality of input/output devices is contained in said system chassis.

23. The system of claim 19, wherein said system chassis is hinged, and includes a keyboard in one portion thereof and a display in another portion thereof.

24. The system of claim 19, further comprising a hard disk drive in said system chassis, said CPU being operatively connected to read and programmably execute software programs therefrom.

25. The system of claim 19, wherein said CPU comprises only one microprocessor.

* * * * *